United States Patent [19]

Shakula et al.

[11] 4,128,367
[45] Dec. 5, 1978

[54] CABLE REPAIR VULCANIZING PRESS

[76] Inventors: Nikolai M. Shakula, ulitsa Moskovskaya, 3a, kv. 31, Kommunarsk Voroshilovgradskoi oblasti; Nikolai I. Voloschenko, Selskokhozyaistvennaya ulitsa 19, kv. 108, Moscow; Nikolai F. Shishkin, poselok VUGI 9, kv. 22, Ljubertsy Moskovskoi oblasti; Anatoly S. Muratov, ulitsa Jubileinaya 16, kv. 15, Podolsk Moskovskoi oblasti; Alexandr P. Guzchenko, ulitsa 13 Linia, 5, kv. 26, Voroshilovgrad; Vladimir M. Anokhin, ulitsa Belinskogo, 1, kv. 9, Kommunarsk Voroshilovgradskoi oblasti; Vladimir F. Nikitchenko, Karierny tupik 8, Voroshilovgrad, all of U.S.S.R.

[21] Appl. No.: 847,751
[22] Filed: Nov. 2, 1977
[51] Int. Cl.$^2$ .......................... B29H 9/11; B29C 3/00
[52] U.S. Cl. ........................................ 425/11; 425/128
[58] Field of Search ................................ 425/11, 128

[56] References Cited

U.S. PATENT DOCUMENTS

| 3,215,761 | 11/1965 | Gelpey | 425/11 X |
| 4,004,867 | 1/1977 | Nelson | 425/11 |

FOREIGN PATENT DOCUMENTS

| 292829 | 1/1971 | U.S.S.R. | 425/11 |

Primary Examiner—J. Howard Flint, Jr.
Attorney, Agent, or Firm—Burgess, Ryan and Wayne

[57] ABSTRACT

A cable repair vulcanizing press comprises a split mould heated by an induction heater. The induction heater includes a multi-leg core for creating an alternating magnetic flux and transmitting it to the split mould whose separating line lies in the plane of the magnetic flux in the core legs. The vulcanizing press is provided with an interlocking device for switching off the vulcanizing press from the power source in case the magnetic circuit is partially or completely opened, i.e. the split mould is either not mounted on the core or mounted inexactly.

9 Claims, 11 Drawing Figures

CABLE REPAIR VULCANIZING PRESS

The invention relates to apparatus intended for repairing industrial rubber goods and particularly to a cable repair vulcanizing press.

The invention may also be used for heating thermosetting pipes which envelope damaged portions of flexible cables and for spot vulcanization of other goods.

It is often necessary to do in situ repairs to flexible cables intended to feed power to travelling current receivers, for instance in opencast or underground mining.

Cable repair in mines with a dangerously high concentration of gas or dust places more stringent requirements upon explosion proofness and fire safety of the cable repair vulcanizing presses.

Known in the art are cable repair vulcanizing presses, wherein moulds are heated with the aid of high-ohmic wire resistors. Heat from the resistors is transferred through an electric insulation to the housing of the cable repair vulcanizing press and to mould half sections positioned within corresponding recesses in the housing.

Main disadvantages of such cable repair vulcanizing presses are the following:

A large mass per unit length of the cable to be repaired, in particular for an explosion-proof model of the cable repair vulcanizing press. This is explained by the fact that the housing of the cable repair vulcanizing press is used not only for accomodating wire resistors but also for exerting adequate pressure upon the cable being repaired, i.e. the cable repair vulcanizing press is subjected to considerable mechanical loads and for this reason it should be made sufficiently strong.

Low reliability on account of a short service life of the resistors which stems from the oxidation of metal and formation of minute cracks.

Low heat efficiency which is accounted for by the fact that in such cable repair vulcanizing presses heat transfers from a heat source not only to the mould half sections but to the whole housing of the cable repair vulcanizing press as well.

Difficulty of providing for fire safety and explosion proofness, which results from the following reasons. The temperature of heating the mould half sections in vulcanization reaches 150° to 160° C.; difference in temperature between the mould half section and the housing is liable to fluctuate from 10° to 25° C. according to gaps which set up large thermal resistance. Thus, the temperature of the housing under the mould half sections turns out to be 160° to 185° C. and in some cases even higher. In accordance with the acting regulations, however, the temperature of the exterior surface of explosion-proof shells should not exceed 200° C. in long-duration operation. Also, it is to be noted that the temperature control of the mould half sections of the cable repair vulcanizing press is often effected with the aid of thermal switch relays which are lacking in high reliability. Scatter of operational values or failure in such relays are liable to heat the cable repair vulcanizing press to temperatures in excess of 200° C. which is impermissible in mines with a dangerously high concentration of gas or dust.

Thus, it is extremely difficult to ensure fire safety of such cable repair vulcanizing presses.

In addition, the heat transfer from the resistor to the mould half section causes considerably high thermal resistances and, consequently, when the mould half section is heated to 150° to 160° C. the temperature of a high-ohmic resistor reaches 300° to 400°.

It is extremely difficult to ensure explosion proofness of a heat source heated to such a temperature.

It is not accidental that in many countries the use of vulcanizing presses incorporating resistance-type heaters in mines with dangerously high concentration of gas or dust is prohibited.

In some cases the housing and mould half sections are made of aluminium alloys which reduces to some extent the mass of the vulcanizing press. But this measure does not help in avoiding other disadvantages of the vulcanizing presses incorporating resistance-type heaters. It should also be noted that it is not advisable to use aluminium or alloys thereof for explosion-proof models because a steel object accidentally dropped onto a shell of aluminium alloys, is liable to cause sparking and hence the inflammation of methan.

Thus, vulcanizing presses incorporating resistance-type heaters are characterized by a number of serious disadvantages which constitute a great impediment to the utilization of the above vulcanizing presses and in some cases rule out such utilization at all.

There is known in the art an induction vulcanizing press as disclosed in U.S.S.R. Inventor's Certificate No. 131005, comprising two inductors each consisting of three-leg core and coils placed on each of the legs carrying mould half sections mounted thereon. The vulcanizing press is provided with an arrangement adapted to force the mould half sections against the inductors and is mounted on a specially designed carriage.

However, the above vulcanizing press is characterized by a great mass per unit length of a cable to be repaired which derives from the fact that:

The vulcanizing press comprises two inductors, which requires two inputs and complicates the provision for explosion proofness.

The inductor is rather complicated and consists of three coils and a core, the compression force being transferred through cores which requires high mechanical strength.

The principal object of the present invention is the provision of a cable repair vulcanizing press which allows for the heating of both mould half sections from one inductor.

Another object of the invention is the provision of a cable repair vulcanizing press having an overheat protection device adapted to protect the vulcanizing press against overheat resulting from a long-duration operation of a magnetic circuit partially or completely opened.

One more object of the invention is the provision of a cable repair vulcanizing press which is protected against overheat resulting from a long duration operation of a magnetic circuit partially or completely opened to ensure explosion proofness of such vulcanizing press in mines.

A further object of the invention is the provision of a cable repair vulcanizing press which ensures the temperature control of mould half sections in operation.

Yet another object of the invention is the provision of a cable repair vulcanizing press whose split-mould has a varying cavity adapted to receive cables to be repaired of various diameters.

These and other objects are attained in a vulcanizing press comprising a split mould adapted to receive a cable to be repaired, and an inductor having a multi-leg core intended to generate and transmit an alternating magnetic flux to the split mould, wherein the multi-leg core and the split mould are mutually arranged so that the separating line of the split-mould lies in the plane of the magnetic flux passing in the legs of the multi-leg core.

Such arrangement of the mould half sections ensures uniform heating thereof from one inductor.

According to one embodiment of the invention, the multi-leg core has three legs, an induction coil being disposed on the middle one.

In order to increase the effective length of the split mould it is expedient that a multi-leg core comprises an uneven number of legs, but more than three, each even leg carrying an induction coil connected in combination with other induction coils into an electric circuit so that the magnetic fluxes of the cores orientated between said induction coils are deducted.

To prevent prolonged work of the vulcanizing press with the magnetic circuit thereof being partially or completely opened, one of the legs conducting an effective magnetic flux carries an interlocking coil inductively connected to one of the induction coils to supply a pulse for deenergizing the vulcanizing press, with the mould half section being removed or displaced.

To improve the reliability of interlocking the supply circuit of the vulcanizing press with the mould half section being removed or displaced the vulcanizing press is provided with compensating coils arranged between adjacent core legs and the interlocking coil in perpendicular planes which pass through the vertical axes of the legs and of the interlocking coil, said compensating coils being connected to each of the circuits of the interlocking coil in series and opposing relationship.

In order to control the temperature of heating of the split mould by varying the magnetic flux passing therethrough, it is advisable to mount a shunt consisting of a plurality of electrical steel sheets and placed parallel to the legs of the core on the external surfaces of mould half sections.

According to one embodiment of the invention, the split mould is provided with an insert made of a material whose coefficient of heat conduction is sufficient to level off the temperature of heating of the split mould. A copper insert conforms to the above requirements most of all.

If desired, a construction with one mould half section fixed on the legs of the core is possible.

The invention will now be explained in greater detail with reference to embodiments thereof which are represented in the accompanying drawings, wherein.

Figure 1:
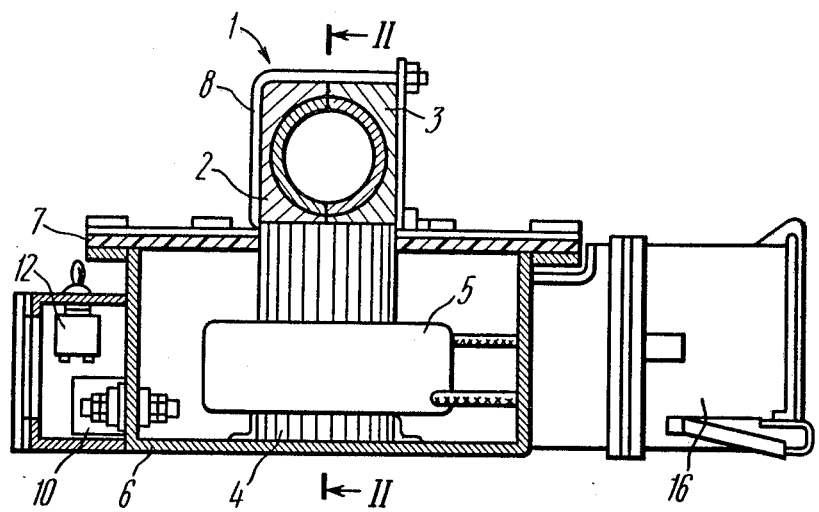
FIG. 1 is a general view of the cable repair vulcanizing press.
Figure 2:
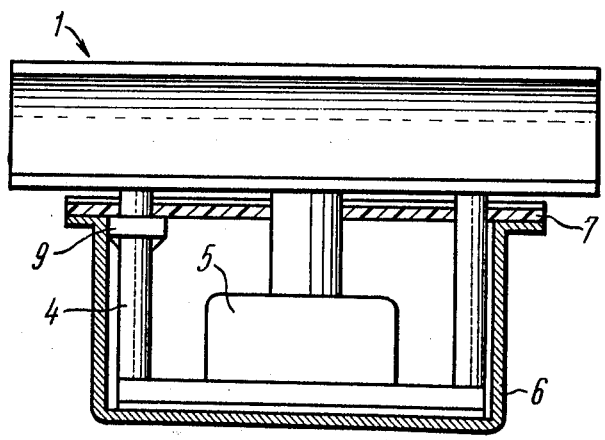
FIG. 2 is a section taken along line II—II in FIG. 1.

Reference is now made to the drawings and in particular to FIGS. 1 and 2 showing a cable repair vulcanizing press comprising a split mould I consisting of two half sections 2 and 3 and adapted to receive a cable to be repaired, an inductor having a multi-leg core 4 and an induction coil 5 mounted on one of the legs of the core 4. The inductor is intended to generate and transmit an alternating magnetic flux to the split mould.

According to the invention, the multi-leg core 4 and the split mould I are mutually arranged to that the separating line of the split mould lies in the plane of the magnetic flux passing in the legs of the core 4. From the standpoint of operation requirements, the most suitable is a vertical arrangement of the legs in the core 4. With such arrangement, the magnetic flux generated in the legs is oriented in a vertical plane and, hence, the separating line of the split mould also lies in the vertical plane, as is illustrated in FIG. I.

According to an embodiment of the invention illustrated in FIGS. 1 and 2 the cable repair vulcanizing press comprises a three-leg core 4, such as a laminated core, having an induction coil 5 mounted on the middle leg of the core 4. The inductor is placed within a housing 6 whose inner space is confined by a cover 7 made of an insulating material. The housing 6 of the vulcanizing press is welded of sheet steel or cast of light alloys. The ends of the legs of the core 4 extent through the cover to the outside; these ends carry detachable half sections 2 and 3 of the split mould I. Both half sections 2 and 3 are forced together by joining stirrups 8. The half sections 2 and 3 are made of a magnetically soft steel. The joining stirrups 8 are passed between the legs of the core 4. As a result, the half sections of the split mould I do not impart the compression force to the core 4.

To ensure the explosion proofness of the vulcanizing press, the interior space of the housing 6 is filled with powdered quartz (for the sake of simplicity not shown), the thickness of powdered quartz layer being selected in accordance with the applicable regulations for the manufacture of explosion-proof equipment. The core 4 is manufactured by stamping electrical steel sheets.

However, it will be clear to those skilled in the art that the core can be manufactured from U-shaped sections, which makes it possible to use cold-rolled strips and to decrease the mass of the core.

Figure 3:
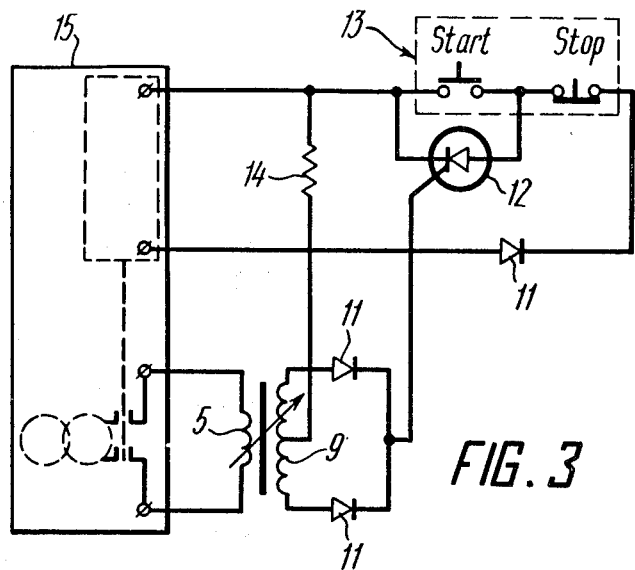
FIG. 3 is an electric diagram of the interlocking circuit.

In order to prevent long-duration operation of the vulcanizing press having its magnetic circuit partially or completely opened, i.e. having its split mould removed or out of position, in this embodiment provision is made of an interlocking coil 9 mounted on the extreme leg of the core 4. The interlocking coil 9 is inductively connected to the induction coil 5 and to an interlocking unit 10 mounted within the housing 6. FIG. 3 illustrates the electric diagram of the interlocking unit 10 comprising diodes II for rectifying the current, a thyristor 12 connected in parallel with a "start" button of a switch 13, and a resistor 14.

The coil 5 is connected to a starting mechanism 15 by means of a connector whose half section 16 is secured on the housing 6.

It should be noted that the arrangement of the interlocking coil 9 along the height of the leg has an appreciable effect upon the value of the electromotive force induced in said coil 9 with the magnetic circuit being either closed or opened; the higher the interlocking coil 9 is disposed on the leg of the core 4, the less is the value of stray flux flowing therethrough.

When manufacturing general-purpose vulcanizing presses, the interlocking coils are arranged as high as possible, as is illustrated in FIG. 2. The mould half sections being in position, the effective magnetic flux flows through the interlocking coil 9 inducing therein an electromotive force sufficient for opening the thyristor.

When manufacturing explosion-proof vulcanizing presses, however, it is necessary to place the interlocking coil into the powdered quartz at the depth of, say, 14 to 16 mm. With such an arrangement of the interlocking coil and with the split mould being removed the stray magnetic flux which is comparable with the operating magnetic flux flows through the core and the coil. This being the case, the electromotive force induced in the interlocking coil 9 is liable to cause a current sufficiently strong for opening the thyristor 12 and shunting the "start" button. Thus, the reliability of the interlocking unit decreases.

Figure 6:
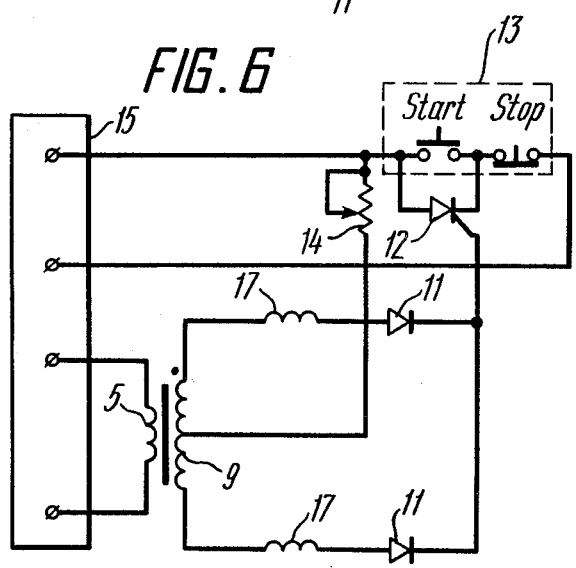
FIG. 6 is a electric diagram of the interlocking circuit of the vulcanizing press, according to another embodiment of the invention.
Figure 4:
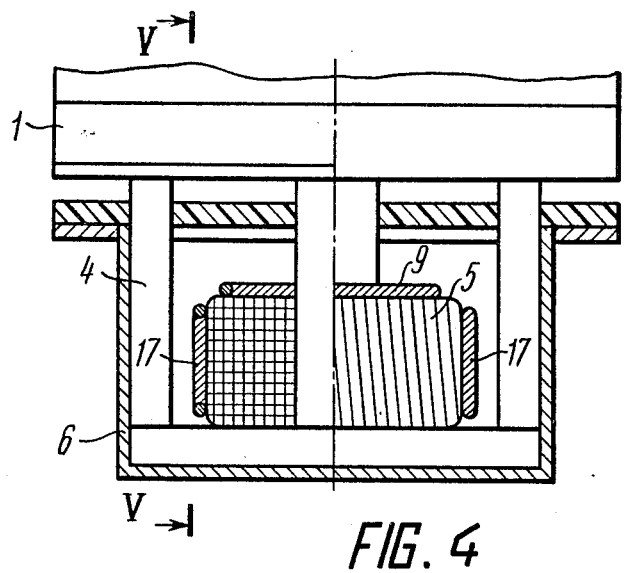
FIG. 4 is an inductor with a partially sectioned induction coil, according to another embodiment of the invention.
Figure 5:
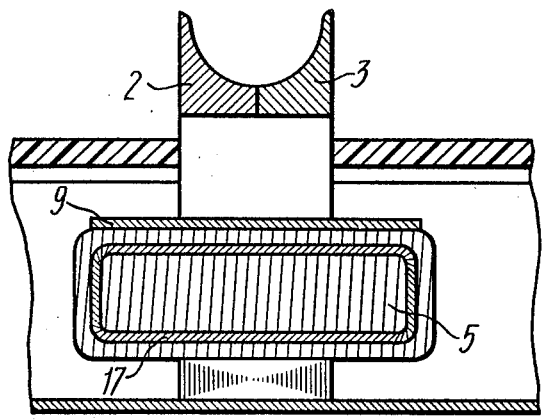
FIG. 5 is a section taken along line Y—Y in FIG. 4.

As is shown in FIGS. 4, 5 the interlocking coil 9 is arranged on the core carrying the induction coil, which is dictated by the specific requirement that the conductors of the interlocking coil 9 should be insulated from the housing 6 without increasing the dimensions thereof. In order to increase the reliability of the interlocking unit in the explosion-proof model of the vulcanizing press, there are placed compensating coils 17 between the legs of the core 4 in perpendicular planes passing through the axes of the legs and of the interlocking coil 9. The compensating coils 17 are connected in series and opened relationship with respect to the interlocking coil 9 in the circuit of the interlocking unit (FIG. 6). The number of turns $W_{17}$ of the compensating coil 17 with respect to the number of turns $W_9$ of the interlocking coil 9 is selected so that with the magnetic circuit being opened, the electromotive force of the interlocking coil 9, determined from the formula $E_9 = -W_9 \cdot (d.\phi_{\sigma_g})/dt$ and the electromotive force of the compensating coil 17, determined from the formula $E_{17} = -W_{17} \cdot (d.\phi_{\sigma_g})/dt$ are equal, where $\phi_{\sigma_g}$ - is a stray flux flowing through the interlocking coil and $\phi_{\sigma_{17}}$ is a stray flux flowing through the compensating coil.

Figure 7:
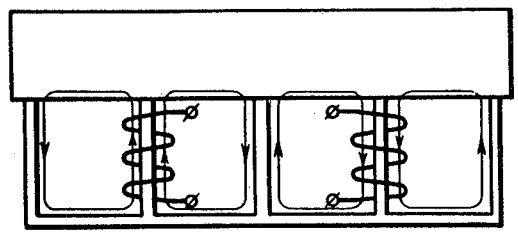
FIG. 7 is a diagrammatic representation of the inductor with the split mould according to one more embodiment of the invention.

According to another embodiment of the invention (FIG. 7) the multi-leg core comprises an uneven number of legs, but more than three, each even leg carrying an induction coil 5. The induction coils 5 are connected into circuit so that the magnetic fluxes of the cores disposed between the induction coils are deducted. With such a construction of the core the mass thereof can be decreased due to a lesser number of the core legs as compared to inductors composed of three-leg cores. This being the case, the cross-section of the legs, wherein the magnetic fluxes are deducted is liable to be comparatively small.

Inasmuch as the temperature in mines situated in temperate climatic zones varies only slightly, the working capacity of the vulcanizing press in case of modest drop in ambient temperature can be provided by means of selecting a proper number of turns in the induction coil.

However, it is extremely difficult to provide for a temperature of heating of the split mould in mines situated in climatic zones which are characterized by sharp temperature drop and in open cast mining.

Figure 8:
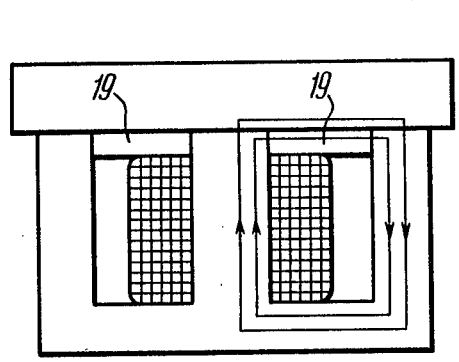
FIG. 8 is a diagrammatic representation of the inductor with the split mould in position, according to one more embodiment of the invention.
Figure 9:
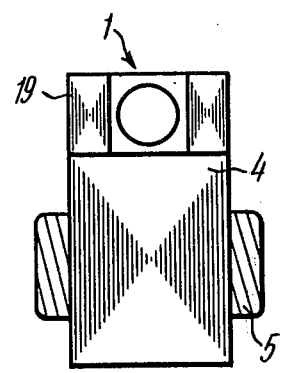
FIG. 9 is a view of the inductor in axial direction with the split mould in position according to one more embodiment of the invention.

To control the temperature of heating the split mould, the vulcanizing press is provided with an electromagnetic shunt 19 composed of a plurality of electric steel sheets established on the external surfaces of the mould half sections, as is illustrated in FIGS. 8, 9 according to an alternative embodiment of the invention. The shunt 19 permits the temperature of the split mould to be controlled by varying the magnetic flux, since in this case the effective magnetic flux is divided into two fluxes, namely: a flux flowing through the magnetic shunt and a flux flowing through the split mould I. The value of the magnetic flux flowing through the split mould I can be selected by varying the position of the electromagnetic shunt 19 with respect to the core 4. When the electromagnetic shunt 19 moves with respect to the core 4 in the plane which is perpendicular to the axis of the induction coil 5, the value of the magnetic flux flowing through the split mould changes.

The electromagnetic shunt is alternatively arranged on the external surfaces of the mould half sections, as is illustrated in FIG. 9 or between the legs of the core 8, as is illustrated in FIG. 8.

Figure 10:
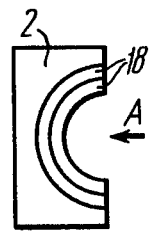
FIG. 10 is a mould half section in axial direction with inserts in position.
Figure 11:
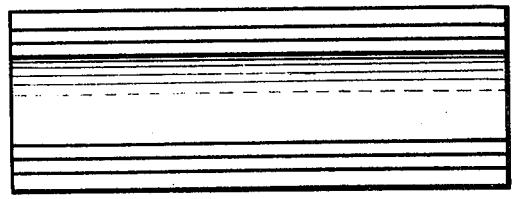
FIG. 11 is a view of the mould half section according to FIG. 10, taken in the direction of arrow A.

According to an alternative embodiment of the invention the split mould I is provided with an insert 18 made of a material whose coefficient of heat conduction suffices to level off the temperature of heating of the split mould around the perimeter and lengthwise thereof. FIG. 10 illustrates the construction of split inserts made of copper and intended both for levelling off the temperature and for repairing cables of various cross-sections, which is achieved by means of removing or installing a necessary number of inserts of different cross-section. This being the case, the necessity of completing the vucanizing press with a great number of the split moulds is excluded.

The above described vulcanizing press is designed for repairing various-function cables: from low voltage cables designed for electric wirings to power cables used in excavators, in which cables voltage reaches 35 kv. The vulcanizing press may be manufactured either stationary or portable.

Herein after there is given a description of main operations while utilizing the vulcanizing press in those cases when only the cable shell is damaged, the insulations of the conductors being intact.

After the damaged portion of the cable has been prepared for vulcanization, the same is put into the mould half sections 2 and 3 which are forced together by stirrups 8. By means of a connector half section the vulcanizing press is connected to the mains.

Now the "start" button of a switch 13 in the distant control circuit is pressed. In the coil 5, there passes a current which creates an alternating magnetic flux in the core 4 and the split mould I. With the split mould I properly installed in the interlocking coil 9, there is induced an electromotive force, and current passes which is sufficient for opening the thyristor 12 and for shunting the "start" button. If the magnetic circuit is opened, the current value in the circuit of the coil 9 is not sufficient for opening the thyristor 12. In this case, after releasing the "start" button, the coil is not energized since the button has not been shunted by the thyristor.

It is to be noted that the mass of the split mould is comparatively small and therefor the time of heating thereof up to a predetermined temperature does not take much time.

As the unvulcanized rubber is being heated and the mould half sections are forced together by means of stirrups. The damaged section vulcanized, the vulcanizing press is switched off with the aid of the "stop" button, the mould half sections 2 and 3 are opened and the cable is ready for operation.

If there is no need for the cable to be put into operation at once, the vulcanizing press is switched off but the split mould is not taken off. In this case the quality of vulcanization improves due to slowly proceeding processes of polymerization.

The above described vulcanizing press has the following advantages:

small mass per unit length;
reliability, long service life;
small time constant for heating and, hence, high heat efficiency, low consumption of electric power;
contactless transmission of power, which provides for higher explosion proofness.

What is claimed is:

1. A cable repair vulcanizing press comprising a split mould adapted to receive a cable being repaired, and an inductor having a multi-leg core and intended to generate and transmit an alternating magnetic flux to the split mould, said core and said split mould being mutually arranged so that the separating line of the split mould lies in the plane of the magnetic flux flowing in the legs of said multi-leg laminated core.

2. A cable repair vulcanizing press as claimed in claim I, wherein the multi-leg core comprises an uneven number of legs, each even leg carrying an induction coil.

3. A cable repair vulcanizing press as claimed in claim 2, wherein the multi-leg core comprises more than three legs, the induction coils being put through so that the magnetic fluxes of the cores disposed between said induction coils are deducted.

4. A cable repair vulcanizing press as claimed in claim 2, wherein on one of the legs through which an effective magnetic flux passes there is disposed an interlocking coil inductively connected to the induction coil to supply a pulse for deenergising the cable repair vulcanizing press, the split mould being removed or displaced.

5. A cable repair vulcanizing press as claimed in claim 4, wherein between the legs of the core and the interlocking coil, in perpendicularly disposed planes which pass through the vertical axes of the legs and of the interlocking coil, there are arranged compensating coils connected to each of the circuits of the interlocking coil in series and opposed relationship.

6. A cable repair vulcanizing press as claimed in claim 1, wherein there is provided an electromagnetic shunt consisting of a plurality of electrical steel sheets placed parallel to the legs of the core on the external surfaces of the mould half sections.

7. A cable repair vulcanizing press as claimed in claim 1, wherein the split mould is provided with an insert made of a material whose coefficient of heat conduction suffices to level off the temperature of heating of the split mould.

8. A cable repair vulcanizing press as claimed in claim 7, wherein the insert is made of copper.

9. A cable repair vulcanizing press as claimed in claim 1, wherein one of the mould half sections is fixed on the legs of the core.

* * * * *

UNITED STATES PATENT OFFICE
CERTIFICATE OF CORRECTION

Patent No. 4,128,367    Dated December 5, 1978

Inventor(s) Nikolai Maximovich Shakula, et al

It is certified that error appears in the above-identified patent and that said Letters Patent are hereby corrected as shown below:

Column 4, line 20:  change "to" to --so--.

Column 4, line 37:  change "extent" to --extend--.

Column 5, line 23:  before "which" insert --(--.

Column 5, line 24:  after "flux" insert --)--.

Column 6, line 41:  change "vucanizing" to --vulcanizing--.

Column 7, line  7:  delete "and".

Signed and Sealed this

Thirty-first Day of July 1979

[SEAL]

Attest:

Attesting Officer

LUTRELLE F. PARKER
Acting Commissioner of Patents and Trademarks